United States Patent
Soret et al.

(10) Patent No.: US 9,955,484 B2
(45) Date of Patent: Apr. 24, 2018

(54) POSITION INFORMATION BASED ACCESS TO A SHARED RADIO ACCESS CHANNEL

(71) Applicant: Nokia Technologies Oy, Espoo (FI)

(72) Inventors: Beatriz Soret, Aalborg (DK); Istvan Z. Kovacs, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 144 days.

(21) Appl. No.: 14/819,656

(22) Filed: Aug. 6, 2015

(65) Prior Publication Data
US 2017/0041916 A1 Feb. 9, 2017

(51) Int. Cl.
*H04W 72/04* (2009.01)
*H04W 74/08* (2009.01)
*H04W 4/02* (2018.01)
*H04W 8/00* (2009.01)
*H04W 72/02* (2009.01)

(52) U.S. Cl.
CPC ......... *H04W 72/048* (2013.01); *H04W 4/02* (2013.01); *H04W 8/005* (2013.01); *H04W 74/0833* (2013.01); *H04W 72/02* (2013.01)

(58) Field of Classification Search
CPC ........... H04W 72/048; H04W 74/0833; H04W 74/02; H04W 8/005; H04W 72/02
See application file for complete search history.

(56) References Cited

U.S. PATENT DOCUMENTS

| | | | | |
|---|---|---|---|---|
| 8,687,564 | B2 * | 4/2014 | Vujcic ................ | H04B 7/2637 370/329 |
| 2011/0038353 | A1 * | 2/2011 | Miki .................... | H04J 11/0026 370/335 |
| 2012/0134336 | A1 * | 5/2012 | Nakaya ................ | G08G 1/094 370/330 |

(Continued)

OTHER PUBLICATIONS

Ghassan M. Abdalla et al. "*Space-Orthogonal Frequency-Time Medium Access Control (Soft MAC) for VANET*" Information Infrastructure Symposium 2009. GIIS '09. Global, IEEE, Piscataway, NJ, USA Jun. 23, 2009, pp. 1-8, XP031558343, ISBN: 978-1-4244-4623-0 p. 1 col. 1, line 1—p. 3, col. 2, line 30.

(Continued)

*Primary Examiner* — Ajay Cattungal
(74) *Attorney, Agent, or Firm* — Harrington & Smith

(57) ABSTRACT

A mobile radio device uses its own location/position information to itself select a radio access resource from a plurality of radio access resources shared among a plurality of mobile radio devices; and sends a transmission on a wireless shared radio access channel using the selected radio access resource. In non-limiting embodiments: the location/position information represents global/absolute physical position, or a position relative to a local reference location within an access region which may be a cell, building, roadway, etc.; and the radio access resources are time slots; frequency blocks; and/or preambles. The examples have a map or algorithm stored in the device's local memory that associates different access resources to different discrete location areas within the access region; the algorithm identifies the location area that corresponds to the location/position information and outputs the selected access resource (or an index/identifier of it) associated with the identified location area.

19 Claims, 5 Drawing Sheets

(56) References Cited

U.S. PATENT DOCUMENTS

| | | | | |
|---|---|---|---|---|
| 2014/0204847 | A1* | 7/2014 | Belleschi | H04W 76/023 370/329 |
| 2014/0309863 | A1* | 10/2014 | Ricci | G01C 21/3484 701/36 |
| 2015/0036598 | A1 | 2/2015 | Kilpatrick, II et al. | |
| 2015/0181573 | A1* | 6/2015 | Takeda | H04W 72/042 370/329 |
| 2015/0327154 | A1* | 11/2015 | Xia | H04W 68/00 370/312 |
| 2016/0007377 | A1* | 1/2016 | Frenne | H04W 56/001 370/329 |

OTHER PUBLICATIONS

Mobile and Wireless Communications Enablers for the Twenty-twenty Information Society (METIS) *Deliverable 4.3 Final Report on Network-Level Solutions* Document No. ICT-317669-METIS/D4.3; Date of Delivery Jan. 3, 2015. pp. 1-148.

M. Rodziewicz, *Location-based Mode Selection and Resource Allocation in Cellular Networks with D2D Underlay*, 21$^{st}$ European Wireless Conference, May 2015.

H. Kalbkhani et al. *Resource Allocation in Integrated Femto-macrocell Networks Based on Location Awareness*, IET Communications Magazine.

H. Wymeersch, *Location-awareness in 5G Wireless Networks*, The Fifth Nordic Workshop on System and Network Optimization for Wireless.

Di Taranto, *Location-aware Communications for 5G Networks*, IEEE Signal Processing Magazine 2014.

ETSI EN 302 637-2, *Intelligent Transport System (ITS); Vehicular Communications; Basic Set of Applications; Part 2: Specification of Cooperative Awareness Basic Service*, 2009.

SAE J2735 Specifications [aka, J2735], SAE International, *DSRC Implementation Guide*, Nov. 2009.

ICT-317669-METIS/D1.1, METIS Deliverable D1.1 *Scenario, Requirements and KPIs for 5G Mobile and Wireless System*, 2013.

M.G. Di Benedetto, T.Kaiser, A.F. Molisch, I. Oppermann, C. Politano, D. Porcino (editors), *UWB Communication Systems—A Comprehensive Overview*, Hindawi Publishing Corporation, 2006. (see Section 4.3 "Location-aware UWB Networks".

\* cited by examiner

602: use location/position information of a mobile radio device to select, by the mobile radio device, a radio access resource from a plurality of radio access resources shared among a plurality of mobile radio devices 604: send a transmission from the mobile radio device on a wireless shared radio access channel using the selected radio access resource

POSITION INFORMATION BASED ACCESS TO A SHARED RADIO ACCESS CHANNEL

TECHNOLOGICAL FIELD

The described invention relates to accessing a shared wireless channel using position/location of a device. Certain example embodiments encompass using the device's global geographical position/location or position/location relative to pre-defined areas of a cell, roadway, building or the like to select a resource used to access the shared radio access channel.

BACKGROUND

Access by user devices to a shared radio access channel by which user devices seek to establish a communications link is a well-known problem. In conventional cellular systems such a shared radio access channel is often the random access channel (RACH), but shared radio access channels can also be used for other purposes such as for example sending device-to-device (D2D) beacons, data/user traffic, or connection requests, or requesting a transmission resource for sending data in a wireless local area network (WLAN) that utilizes license-exempt spectrum. In a distributed way, the mobile radio device (more generally, a user equipment UE) can autonomously sense the channel before transmission to check that no other UEs are using it. However, this sensing does not completely resolve the potential collisions when other UEs are doing the same, although it does reduce the probability of collision. Another technique for UEs to access a shared radio access channel is to have the radio network supervising the process in a centralized way such that the UE uses the channel resources only upon authorization from the network.

Many WiFi-type radio technologies utilize distributed carrier sense multiple access, either with or without collision detection and avoidance. In LTE, a contention-based and a non-contention-based solution are available. For both of these solutions in LTE a total of 64 preambles per cell are available to minimize the probability of collision. With contention based channel access the UE randomly picks one of these preambles. In case of collision between UEs transmitting their randomly selected preambles at the same instant there are other mechanisms such as backoff periods to help resolve this; this is an example of distributed control. With non-contention based channel access the network indicates to the UE which preamble the UE should use for its uplink transmission. Having the network coordinate and assign preambles is an example of centralized control.

The distributed solution has obvious advantages in terms of simplicity, but it is less effective in avoiding collisions which can be a critical factor where a very large number of UEs try to access the radio channel at the same time. The centralized solution more effectively avoids collisions, but with an accompanying cost in complexity and average delay due to required signalling to/from the UEs. While the outage delay may be under control in the centralized case, in the distributed case there is the potential for unbounded delays in the UE gaining access to a channel.

Presently many wireless radio devices communicate with each other while moving from one place to another. The communications between the devices that involve human interaction are known generally as D2X communication which includes device-to-infrastructure (D2I) as well as device-to-device (D2D) communication. The communication between any devices which do not necessarily need human interaction is generally known as machine-type communication (MTC) or machine to machine (M2M) communication. MTC to/from a communication devices embedded in the vehicles are specifically known as vehicular communications V2X and includes both vehicular-to-infrastructure (V2I) and vehicle-to-vehicle (V2V), which along with MTC in general is expected to become more common with the development of 5G radio access technologies. Whether MTC or D2X, sometimes there is a large number of devices in a relatively small region that are trying to communicate at about the same time; for example commuters and/or their vehicles during rush hour. When many such densely packed communication devices are seeking channel access the problem of collisions on the random access channel (RACH) or on other radio channels becomes most acute. Embodiments of these teachings that are more particularly detailed below address these and other problems.

The following references provide a more thorough background that may be relevant to these teachings:

H. Rodziewicz, *Location-based mode selection and resource allocation in cellular networks with D2D underlay*, $21^{st}$ European Wireless Conference, May 2015.

H. Kalbkhani et al., *Resource allocation in integrated femto-macrocell networks based on location awareness*, IET COMMUNICATIONS MAGAZINE.

H. Wymeersch, *Location-awarenesss in 5G Wireless Networks*, THE FIFTH NORDIC WORKSHOP ON SYSTEM AND NETWORK OPTIMIZATION FOR WIRELESS.

Di Taranto, *Location-aware Communications for 5G Networks*, IEEE SIGNAL PROCESSING MAGazine 2014.

ETSI EN 302 637-2, *Intelligent transport system (ITS); vehicular communications; basic set of applications; part 2: specification of cooperative awareness basic service*, 2009.

SAE J2735 specifications [aka, J2735], SAE International, *DSRC Implementation Guide*, November 2009.

ICT-317669-METIS/D1.1, METIS deliverable D1.1 *Scenario, requirements and KPIs for 5G mobile and wireless system*, 2013.

M. G. Di Benedetto, T. Kaiser, A. F. Molisch, I. Oppermann, C. Politano, D. Porcino (editors), *UWB communication systems—A comprehensive overview*, HINDAWI PUBLISHING CORPORATION, 2006. (see Section 4.3 "Location-aware UWB networks").

SUMMARY

According to one aspect of these teachings there is a method for operating a mobile radio device, comprising: using location/position information of the mobile radio device to select, by the mobile radio device, a radio access resource from a plurality of radio access resources shared among a plurality of mobile radio devices; and sending a transmission from the mobile radio device on a wireless shared radio access channel using the selected radio access resource.

According to another aspect of these teachings there is an apparatus comprising at least one processor and at least one non-transitory memory including computer program code. In this aspect the at least one memory and the computer program code are configured with the at least one processor to cause the apparatus to use location/position information of a mobile radio device to select, by the mobile radio device, a radio access resource from a plurality of radio access resources shared among a plurality of mobile radio devices; and to send a transmission from the mobile radio device on a wireless shared radio access channel using the selected radio access resource. In one implementation the apparatus is the mobile radio device, or one or more components thereof.

According to a further aspect of these teachings there is a computer readable memory having stored therewith computer program code, which when executed controls a mobile radio device to at least use location/position information of the mobile radio device to select a radio access resource from a plurality of radio access resources shared among a plurality of mobile radio devices; and to send a transmission from the mobile radio device on a wireless shared radio access channel using the selected radio access resource.

In a still further aspect of these teachings there is an apparatus comprising selecting means and sending means. The selecting means is for using location/position information of the apparatus to select a radio access resource from a plurality of radio access resources shared among a plurality of mobile radio devices. The sending means is for sending a transmission from the apparatus on a wireless shared radio access channel using the selected radio access resource. In one implementation the apparatus is a mobile radio device or components thereof; the selecting means is one or more processors with at least one non-transitory memory storing a map or algorithm that associates either global geographic position information or geographic regions within a cell, building or other defined access region with different access resources; and the sending means is a radio transmitter.

DETAILED DESCRIPTION

Figure 1:
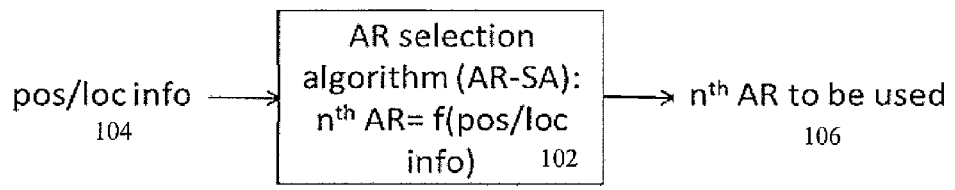
FIG. 1 is a block diagram illustrating operation of an access resource selection algorithm according to certain aspects of these teachings.

Embodiments of these teachings concern distributed control of access by multiple UEs or other MTC radio devices to the shared radio access channel. Some examples below also include some network assistance to the UEs or other MTC radio devices: in one aspect this network assistance aids the UE/radio device in determining the radio device's own location/position information; and in another aspect this network assistance provides to the UE or other MTC radio device the device's own location/position information (for example, to support certain legacy UEs or MTC radio devices which do not have this capability themselves).

According to certain embodiments of these teachings there is an association between discrete location areas within an access region and specific radio access resources, and this association is distributed among the various radio devices for storage in their local memory. The access region may be a conventional cell, a building, a roadway or the like, and there are a plurality of radio access resources associated with a given access region (for example, in conventional LTE the access region might be a cell and the radio access resources might be preambles for the RACH as detailed further below). The plurality of radio access resources are shared among a plurality of mobile radio devices. When a mobile radio device wants to access the shared radio access channel, from the distributed association that is stored in its local memory it finds the location area that corresponds to the mobile radio device's current position and selects the access resource associated with that location area, which in some examples below is a pre-defined geographic area. As will be detailed below there are several ways to embody this association between discrete location area and access resource, such as a geographic/location/position map or an algorithm that takes inputs of geographic/location/position of the mobile radio device and outputs the selected access resource.

Because the techniques described herein are not specific to any given radio access technology, the term radio access resource is used to encompass different types of over-the-air radio resources used by the different types of radio access technologies for channel access by a mobile radio device. In 3GPP type cellular technologies the UEs typically select a preamble which they transmit on the RACH according to a specified random access procedure, in which case the preamble is the relevant radio access resource. Generally 64 orthogonal preambles are used in the LTE system to minimize collision probability. In other radio access technologies the relevant radio access resources of a specified radio channel may be different time slots, different frequency domain blocks, different combinations of time and frequency block, different orthogonal resources in the space domain, various combinations of the above, or various other forms of orthogonality. In this regard the radio access resources are over-the-air resources that distinguish one transmission from another, as opposed to hardware resources in the radio devices themselves.

Advantages of these teachings are expected to be most pronounced in the case of dense massive access with many wireless radio devices seeking access to the shared radio access channel within a short period of time. Such scenarios may occur in urban rush hours as well as in many D2D and MTC situations. Among other embodiments the terms UE and mobile radio device include both portable mobile radios (e.g., hand-held, wearable on or implantable in the body) and vehicle-mounted radios and other MTC type radio implementations. These teachings can be deployed for conventional user voice/data communications as well as MTC, V2X and D2X communications for example.

Figure 2:
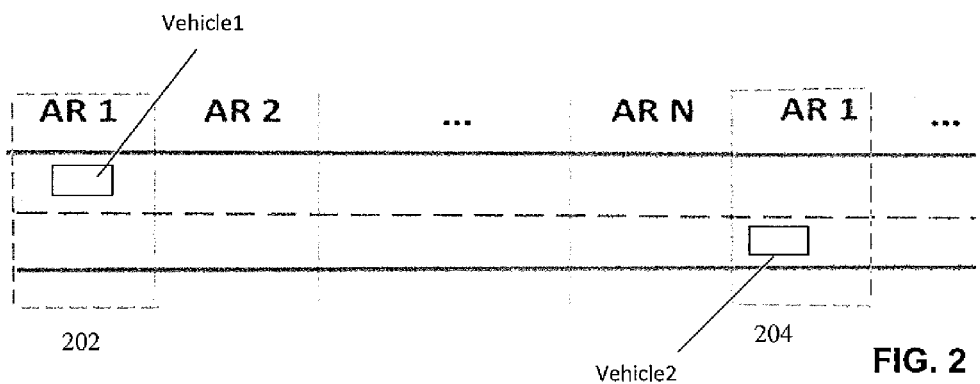
FIG. 2 is a plan view of a portion of a map showing discrete geographical location areas within a cell that define access regions as segments of a road and access resources associated with each discrete location area, according to certain aspects of these teachings directed towards V2X deployments.
Figure 3A:
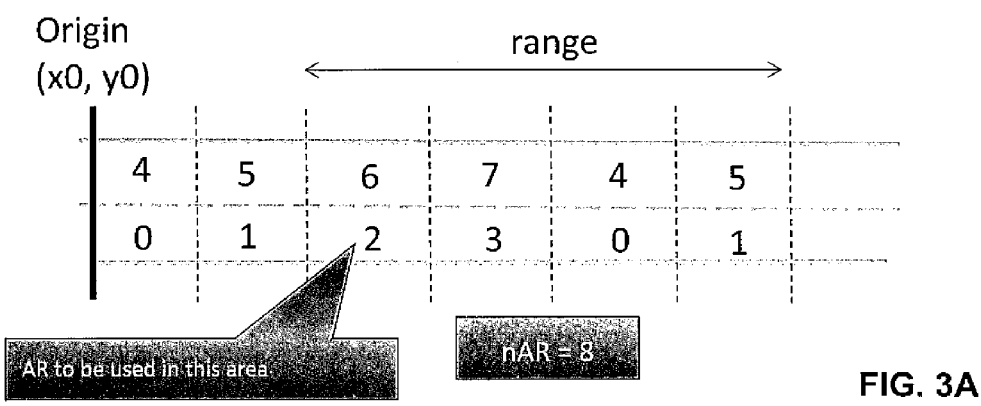
FIG. 3A is similar to FIG. 2 except in FIG. 3A the different discrete location areas/road segments each cover a portion of only one lane of the road, according to certain aspects of these teachings directed towards V2X deployments.

As will be shown quantitatively below, the techniques herein using location/position information of the radio device to select a radio access resource measurably reduces collisions as compared to the conventional way, for example where the UEs randomly select from among a pool of RACH preambles that are available cell-wide. By assigning to a radio device a specific access resource from the available set of orthogonal access resources by taking into account the radio device's position/location information, it can be arranged that different access resources will be assigned to radio devices that are located close to but still some minimum distance apart from one another. FIGS. 2-3C show this specifically, and the meaning of the term close in this context depends on the coverage/radio range of the specific radio device and radio access technology being used; close for access to a cellular RACH would generally span a larger radio range than close in the context of accessing a WLAN shared access channel since cellular generally has a much larger radio range than WLAN.

These teachings are quite different from other location-based resource allocations such as described in the paper by M. Rodziewicz referenced in the background section above, in which the algorithm is centralized whereby the eNB estimates the distance between the UEs and allocates D2D and D2I uplink resources accordingly. Apart from being centralized the Rodziewicz algorithm relies on the relative distance between UEs as opposed to the UE's physical position whether in absolute terms or relative to some fixed geographic reference position within a cell, building, roadway or the like. Other prior art approaches to utilizing position information for resource allocation based on location information collected from the mobile radio devices, but these also represent a centralized resource allocation approach by a base station, and moreover, inventors have found none of the prior art to cover the random access mechanism. Examples of these teachings concern a distributed (or hybrid in certain aspects involving network assistance) allocation algorithm, where UE performs the selection of the specific radio access resource by taking into account its own location/position information either in terms of global physical position, or predefined discrete location areas within a cell or other type of access region to which a plurality of radio access resources are associated. Examples of these teachings cover random access mechanism.

It is common that smart phones are equipped with GNSS and can get their respective position with an accuracy of few meters (6-8 m) even without network assistance. Generally network assistance in this regard enables a much faster determination of the UE's geographic position. This tendency is expected to continue during the development of 3GPP 5G communication systems, with faster and more advanced positioning and with precisions down to less than one meter or even a few centimeters is under investigation. Furthermore, apart from GNSS there are other techniques to obtain location/position information depending on the exact application/service, such as for example based on vehicular sensors, radio-frequency identification (MD) tags, short range radios such as for example Bluetooth/Zigbee/WLAN, cellular radios, image processing techniques, as well as combinations of different radios and methods. In general, the GNSS example is most commonly used for outdoor scenarios, whereas the other mentioned technologies are more typical for indoor cases such as within buildings.

While not essential to these teachings, there are some standardized processes for obtaining and/or reporting a vehicular mobile radio device's geographic position. For ITS applications the ETSI has defined the CAM message [see the ETSI EN 302 637-2 document referenced in the background section above] including a standardized field ReferencePosition, which contains information of the vehicle's position and heading. Similarly, the current SAE J2735 specifications [see the SAE J2735 document referenced in the background section above] describe a standardized data frame (DF_FullPositionVector) for DSRC messages, which contains a full report on the vehicle's position (latitude/longitude as a 32 bit value, and with spatial resolution of $\frac{1}{10}^{th}$ microdegree), speed, heading and an instant in time. The non-limiting examples below assume at minimum this tyype of location data is available and exchanged between vehicles and/or infrastructure network equipment.

Other implementations of these teachings may use specifics of the mobile radio device's location different from what may be required for vehicular positioning standards. For example, MEM has defined an indoor positioning accuracy lower than 0.5 meters [see the METIS document ICT-317669-METIS/D1.1 referenced in the background section above] which is being discussed for the positioning requirements for 3GPP 5G cellular communication systems. In another example apart from vehicular positioning, geographic position/location information has been proposed to be used for traffic routing and neighbor node discovery in ad-hoc D2D-like networks in the document UWE communication systems—A comprehensive overview document referenced in the background section above.

While the specific examples herein relate to 3GPP LTE/5G communications, the present teachings can be applied to any wireless radio access technologies and use cases where an access to a shared radio access channel takes place. The advantages of these teachings are expected to be most pronounced for vehicular communications towards the network (V2I) or to other vehicles (V2V), and in scenarios with dense massive access where a large number of arbitrary wireless radio devices try to access the channel at the same time. Similarly to the vehicles, both the mobile device communication with the network as well as directly with another mobile device can benefit from these teachings. The access by these multiple devices is such that in certain example embodiments below the association of the radio access resources with different discrete location areas of a given access region is distributed among the mobile radio devices in the given access region who each store it in their own local memories; in this way the mobile radio devices can select the access resource corresponding to their own position without excess control signalling with the network and at the same time minimize the probability of multiple access collisions since the mobile radio devices can obtain their local or global position themselves, or with some network assistance.

The examples below assume that the mobile radio devices have knowledge of their own location coordinates with good precision. This knowledge may be obtained for example by GNSS, radar, sensors or any other wireless technology (cellular technologies, wireless local area technologies, or combination therein of). The location/position information can be obtained by the mobile radio device (either completely itself or with an assistance information received from the network), or alternatively it can be provided by the network. This position/location information is considered to be a unique metric among all the mobile radio devices that may be trying to access the radio access channel, at least unique in a given geographical area such as the base station macro cell or other type of access region.

The examples below further assume that the radio access channel is divided (or partitioned on demand) into several orthogonal radio access resources, of which several non-limiting examples are detailed above. In any practical radio communication system there will be a finite number of such access resources, and for purposes of explanation consider there are a total integer number of N access resources available for use in a given access region. The access resources can be further grouped into resource pools, depending on the air-interface design and numerology; current developments of the 3GPP 5G cellular system are considering such resource pools.

In one example of the approach herein the network distributes to all the mobile radio devices in a given access region (cell, building, roadway, etc.) the association of radio access resources to the different location areas of the access region, for example by broadcasting it in System Information if the association is specific to individual cells, or being published in a wireless standard if the association is more generic across cells. However it is made available to them, the mobile radio devices store the association in their local memory, to be utilized for example when powering up or when about to be handed over to a new cell or other such access region while roaming in idle or similar mode in which the mobile radio device does not have a dedicated bearer allocated.

The form of this association stored in the mobile radio device's local memory may be a map or an algorithm for example. One particular example below assumes an algorithm since that is more susceptible to being published and not needing to be sent over the broadcast channel. In other embodiments the map can be pre-loaded such as in a V2I deployment and the network provides updates as needed (via a broadcast or other channel).

Consider a non-limiting example in which these teachings are deployed such that a stored algorithm is used by a user equipment (UE) to select a RACH resource (such as preamble, time and/or frequency slot, etc.). Prior to accessing the shared radio access channel (RACH in this case) to establish a data connection, the UE would run the access resource selection algorithm (AR-SA) 102 to decide which access resource of the RACH to use as shown at FIG. 1. The input 104 to the AR-SA is the location/position information of the UE itself, which for this example is the UE's geo-coordinates (see FIGS. 2-3C for further illustrations). All UEs in this case should have an internal implementation of the same standardized AR-SA. The standardized AR-SA algorithm 102 gets the location/position information as input 104, and gives the $n^{th}$ radio access resource to be used by that UE as output 106.

Particularly for the case of an AR-SA that is standardized across multiple or all access regions such as standardized for a given radio access technology, it is preferred that such a standardized AR-SA has the following properties:

Due to the finite number of ARs they will likely be re-used for different location areas that form an access region. In this case two different input values of the location/position information can lead to the selection of the same $n^{th}$ AR to be used by two different mobile radio devices. The reuse of radio access resources should however be done in such a way that it does not happen (or happens with reduced probability) for any two different location/position information values that correspond to a small physical separation distance between those two positions, and hence the two radio access devices at those positions will not be physically close to one another (where a close separation distance is in the context of the relevant radio access technology as above, and so typically would also be related to radio transmission range and how the access region is defined—cell, building, etc.). FIGS. 2-3C illustrate such reuse spacing, and the overall principle is not unlike the Global System for Mobile Communications (GSM) which uses a 7-cell frequency reuse. Carefully planning the radio access resource reuse in this manner minimizes the potential for collisions in the radio access channel from radio access devices in the same access region that share the plurality of radio access resources. Of course, the minimum physical distance that the algorithm can guarantee depends on the granularity of the location areas into which the access region is parsed and also the number N of defined or configured radio access resources for the access region. Optimizing this reuse regimen involves design tradeoffs among mobile radio device density, number of access resources and collision probability.

For at least some implementations such as where global position information is used, there should be no 'inverse function', i.e. given a selected access resource it is not possible to infer the exact global coordinates of the mobile radio device using that access resource and at most only the local position information should be derivable by using the access resource to obtain position. This follows naturally from the fact noted above, that two values of the position information can lead to the selection of the same $n^{th}$ access resource. In some other implementations using geographic position such an inverse function might be advantageous, for example for V2V communications.

While there are a variety of algorithms that may be devised to implement these teachings, for completeness following is one example algorithm for selecting a radio access resource. First, the absolute location of the device in UTM coordinates (x_a, y_a) that may be obtained from the radio device's GNSS coordinates. Next, values for (latitude, longitude) is mapped to the relative coordinates (x_r, y_r) with respect to a specified/predefined origin (x0, y0), where the origin can be for example at the beginning of the roadway, as shown in FIG. 3A. Each radio access resource (AR) can be indexed to a unique identifier (AR-ID) and the algorithm determines the identifier of the radio access resource as:

AR-ID=mod(distance/min_distance,numAR/number_lanes)+numAR/number_lanes*lane_number where:

distance=sqrt($x\_r^2+y\_r^2$) is the distance to the origin (x0,y0);

min_distance is the estimated minimum distance between devices. Set to 10 m as an example in the V2V case;

numAR is the maximum number of orthogonal radio access resources (N=8 as noted by example above);

lane_number is the lane identifier that the car occupies (with two lanes, it can be for example 0 or 1);

number_lanes is the number of lanes in the road, for example 2; and

AR-ID is the identifier of the selected access radio resource from the pre-defined set of numAR orthogonal radio access resources associated with the given access region.

In the case of communication between the radio access device and the network where the access region is a cell or a portion of it, the relevant portion of the network cell, or the whole cell, can be parsed into geographic regions/sectors which are more generally termed location areas, and the radio access resource would be selected which corresponds to the location area in which the mobile radio device is located. The relevant location area can be identified for example based on the position coordinates of the mobile radio device with respect to some predefined origin, where the predefined origin can be for example the coordinates of the base station/access node location or of a specific point along the roadway or any other fixed geographic way-point. The origin can also be dynamic, determined by the network (ITS application) and signaled to the mobile radio devices, and be set depending on traffic conditions (cars density, speeds, road conditions, etc.).

As another example, the selection can be made based on the last digit or last few digits of the mobile radio device's one or more location coordinate (e.g. GNSS).

In yet another example the AR selection can be made based on a modulo operation on the at least one determined location coordinate of the device.

In yet another example, the location/position information is used in a combination with other techniques for selecting an AR. For example, a subset of ARs is selected based on the mobile radio device's location/position information, and a particular AR from the selected subset is chosen using a different method, such as for example random selection by the mobile radio device or a more sophisticated algorithm stored in the devices local memory.

Figures 5, 6:
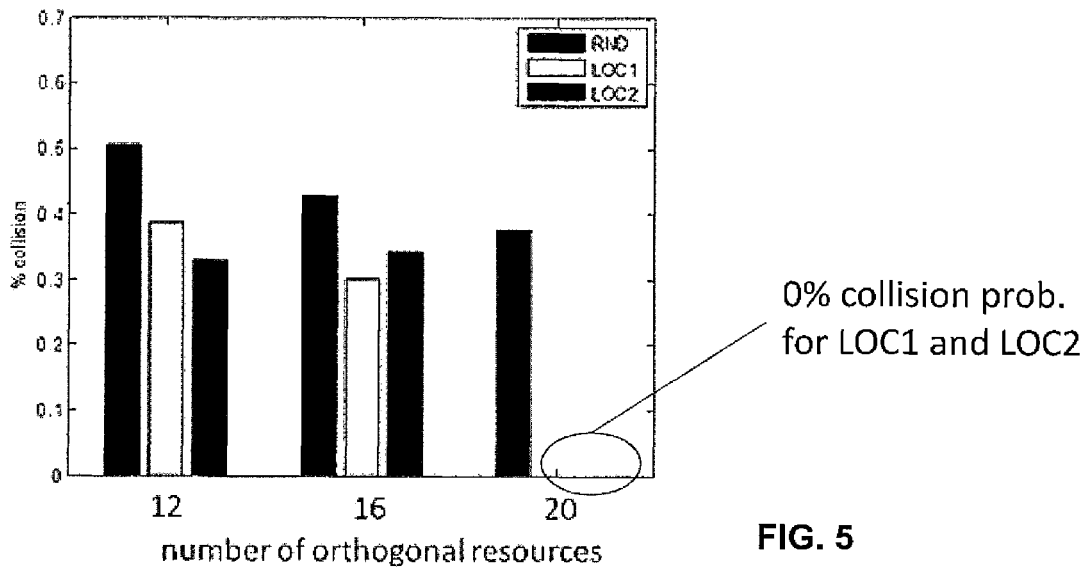
FIG. 5 is an example chart of likelihood of transmission collisions versus the number of available orthogonal access resources, and comparing results for conventional random selection of an access resource and for two different implementations of these teachings for selecting an access resource for the V2V communications.
FIG. 6 is a process flow diagram for selecting a radio access resource based on the radio device's location/position information according to certain embodiments of these teachings.

In the V2V case in which the location areas that correspond to the individual access resources are over lanes of a roadway (see FIGS. 2-3A), the inventors' simulations have found that the condition where there will be no collisions is when the number N of access resources is greater than or equal to number_of lanes multiplied by the radio_transmisison_range and divided by the distance. If we assume 2 lanes, the minimum V2V distance within one lane is 10 meters (see FIGS. 2-3A) and the radio range of V2V communication is 100 meters, then 20 unique radio access resources will be enough to have essentially no collisions as is shown in FIG. 5.

In the conventional RACH procedure for LTE, the UE randomly selects one orthogonal preamble from a subset of the complete set of the 64 available preambles in the cell and transmits that randomly selected preamble to the base station/eNB in the next available subframe. In this case if two UEs send the same preamble sequence in the same time-frequency slot there will be a collision. Adapting these teachings to the LTE RACH context could use location information to select a particular preamble in one example, or to select a particular random access slot in another example, depending upon whether the access resource that corresponds to geographic location area is preamble or time-frequency slot.

The reader will appreciate that these teachings can be employed for an access to a shared radio channel in the scenarios of D2D (device to device) and D2I (device to network infrastructure) communication; V2V (vehicle to vehicle) and V2I (vehicle to network infrastructure) communication; as well as M2M (machine to machine) communication.

FIGS. 2-3A illustrate portions of a map showing discrete geographical location areas that define segments of the access region which is a road, and identifiers of access resources associated with each of these discrete location areas. These are non-limiting embodiments in which the teachings herein are deployed specifically to advantage vehicle communications and so the specific location areas to which are associated access resources are sections of the busiest roads in the cell. Other portions of the cell, including some less-travelled roads, may use conventional random access procedures side by side with these, so for example there may be 12 preambles reserved for use according to these teachings when accessing the shared radio access channel, 42 preambles reserved for random selection by UEs as in conventional contention-based random access in LTE, and the remaining 10 preambles reserved for assignment by the network for conventional non-contention based access.

In the above example of a hybrid-type cell using multiple different access protocols/procedures side by side, the UE seeking to access the radio access channel would first check its position/location to determine which access protocol/procedure to utilize. If the check shows the UE is on the road (or is within some otherwise defined first-designated portion of the cell) it would select the random access procedure which uses the UE's position/location as an input as described herein to select an access resource, and if the check shows the UE is not on the road (or is within some different second-designated portion of the cell) it would select a different random access procedure that selects the access resource independently of the UE's location within the cell. In this case the plurality of available access resources are associated with the cell overall, but a first subset of those available access resources (12 in the above example) is associated only with the first/road portion while the non-overlapping second subset of those available access resources (42 in the above example) is associated with the second/remaining portion.

Other deployments can divide the whole cell into a given number of location areas depending on the number of available radio access resources, where each location area is assigned with a given radio access resource such as preamble or time and/or frequency slot for example. The mobile radio device would then use its location/position information to determine a sector/location area and use the algorithm or map to find the radio access resource associated with that sector/location area of the overall access region. Assuming the access region is a cell, in this case the same access resources would be used in adjacent cells and so the reuse plan would need to take that into account along the entire neighboring cell boundaries rather than only at the roadway crossings between neighboring cells. If the number of available orthogonal resources is not sufficient to cover the expected simultaneously accessing devices within a location area, the ARs will be reused also within a cell. More than one AR can be assigned to each location area and the AR within a given location area will be selected either randomly or according to some further algorithm as detailed above.

There are various options for the selection algorithm as noted above, for example a map and an algorithm. One implementation of the map option is to assume that the mobile radio device has the map loaded with the geographic location area partitions, in such a way that the GNSS position (or the mobile radio device's position obtained with any other method) is set in the map with the partition and the corresponding access resource is selected accordingly. Another implementation is that the mobile radio device will run some radio access resource selection algorithm such as the example above. In practice the actual outcome of the algorithm will depend on the number of available radio access resources, usage scenario, and other factors for minimizing collisions.

FIG. 2 shows a very simple way to implement the association between radio access resources and geographic location areas of a cell or other type of access region, specifically for the purpose of V2X communications. In the FIG. 2 example the roadway is divided into N consecutive segments. The access resource selection algorithm, when designed with the access resource reuse considerations and the closeness of the location areas mentioned above, would ensure that the mobile radio devices in vehicles closest to one but in different location areas another will always be using different access resources. So for example if a vehcicle 1 within geographic region 202 of FIG. 2 were attempting to access the radio access channel at the same instant as a vehicle 2 within geographic region 204 of FIG. 2, they would both be using AR1 but since the geographic location areas are beyond their V2X radio transmission range their transmissions may not collide in fact.

FIG. 3A illustrates similar to FIG. 2 but assumes there are N=8 total access resources available for geographic location areas defined by the illustrated two-lane road. Each number 0 through 8 may be considered an index to one of those unique access resources, and the associated geographic location area is the lane of the road between the two dotted lines where the index lies.

Figure 3B:
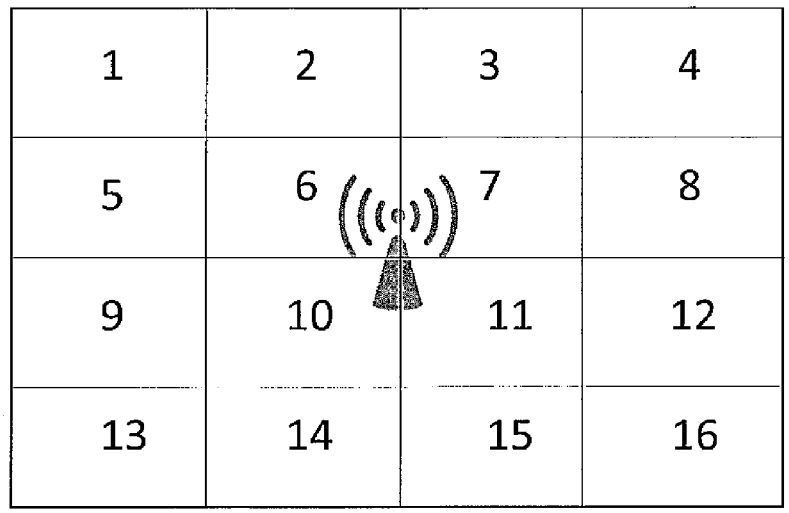
FIG. 3B is similar to FIG. 2 but with the discrete location areas partitioning example for a network cell or a building via a simple rectangular pattern.
Figure 3C:
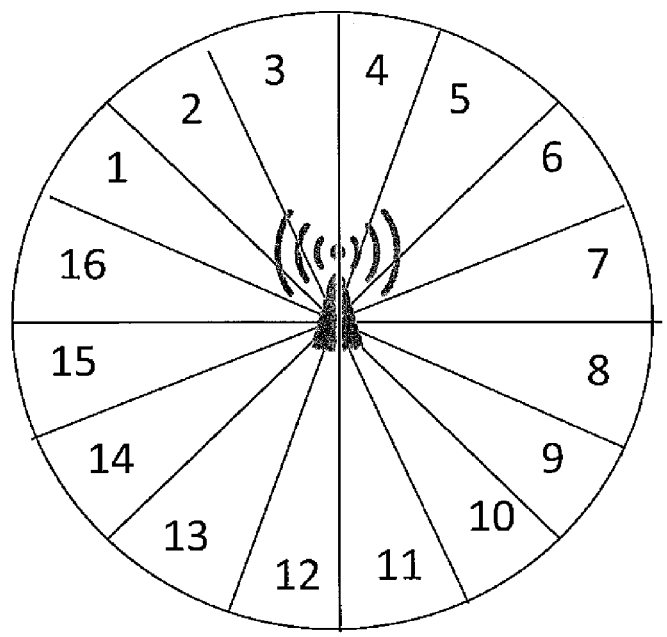
FIG. 3C is similar to FIG. 3B but with the discrete location areas showing another geometry for partitioning a cell or other coverage area.

FIG. 3B shows rectangular location areas with the AR index in each showing the corresponding ARs, for a rectangular access region such as a building. Each location area may be only one floor of the building and each floor has location areas similar to those shown at FIG. 3B, with the AR re-use planning taking into consideration the three-dimensional aspects of per-floor location areas in a multi-floor building. Alternatively, each location area may span two or more floors based on the radio range of the relevant radio access technology being deployed.

FIG. 3C illustrates another geometry for arranging geographic location areas, specifically a rounder access region more suitable for the environment of a conventional cellular access area in a non-urban setting. In this case the location areas are generally pie shaped, and like FIG. 3B there are sufficient ARs available in the FIG. 3C deployment that no AR needs to be re-used in the same access region.

Above was mentioned the concept of network assistance to the UE during the UE's process of selecting the access resource it will use on the shared radio access channel. While the above examples assumed the mobile radio device was capable of determining its own position with sufficient accuracy given the granularity of the geographic location areas in the access region, whether by GNSS or by position obtained with any other method that is unique within the access region of interest and can be mapped into an AR identifier in a similar way, in practice this cannot be assumed for each and every mobile radio device that may be accessing shared radio resource. There are two types of network assistance depending on how far the mobile radio device falls from the above capabilities.

In one type of network assistance the eNB or some other network access node (such as a WLAN access point for example) would provide position assistance information to the connected UEs or other mobile radio devices to determine their location/position information (or an abstracted version of it). For example, this assistance information can be the serving eNB's position/location information or an abstracted version of it, definitions of the physical road segments as shown in FIG. 2, local geographic coordinate procedures to be used in the mobile radio device, and so forth. This is for the case of individual mobile radio devices that either lack GNSS or other position determination means, or whose existing position determination means do not provide sufficient precision given the granularity of the location areas in the access region that are associated with specific access resources.

In another type of network assistance the eNB or other such network access node (such as a WLAN access point for example) would serve as a central repository of the mobile radio device location/position information. In this case the network would collect and determine the position/location information of several mobile radio devices, and signal this location/position information to the corresponding devices or to all the mobile radio devices in the access region (which can be in some cases an eNB cell). Whereas in conventional LTE base station signals the preamble set to be used to the UE prior to the access to the channel, in this type of network assistance the network signals the individual positions of the UEs which then run their own algorithm or consult their own map to determine for themselves which preamble (or time and/or frequency slot or any other orthogonal resource from the set of available orthogonal resources) to use for their access of the shared radio access channel.

Figure 4:
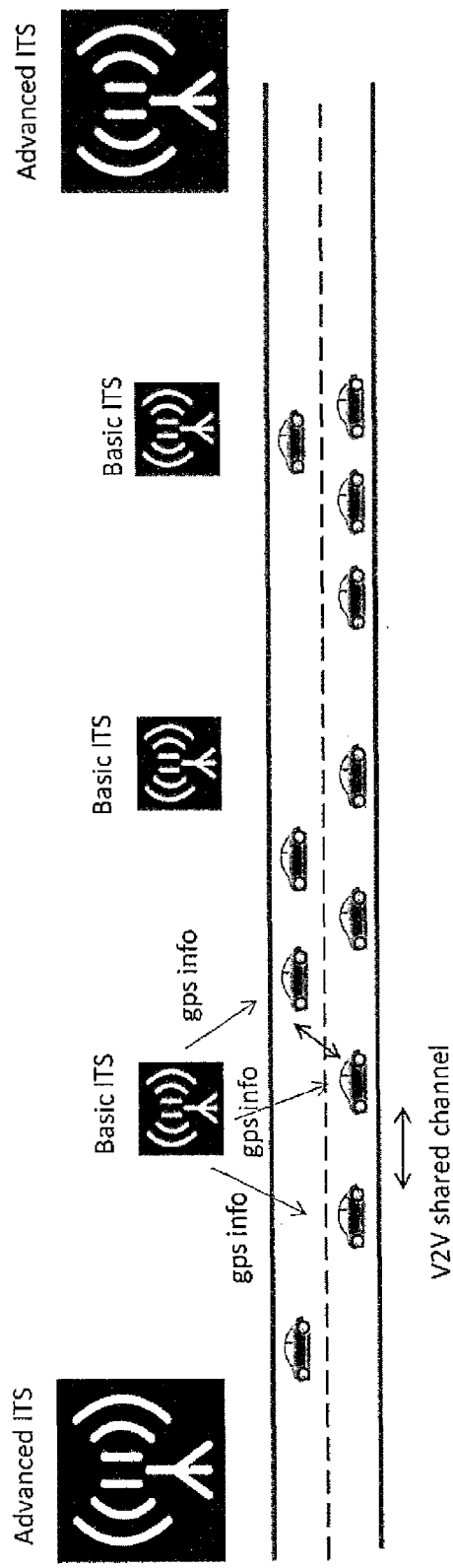
FIG. 4 is a plan view schematic illustration of V2V communications using network-assisted position information to select an access resource according to certain aspects of these teachings.

FIG. 4 illustrates the general operation of the network assistance embodiments using as example the vehicle-to-vehicle communication scenario (V2V). The advanced ITS nodes are assumed to have a higher processing capacity (e.g., dedicated ITS support only) and the basic ITS access nodes are eNBs with a more basic ITS functionality. The basic ITS nodes take on the role of network assistants by sending/broadcasting the location/position information (shown as GPS by example) to the vehicle mobile radio devices in the area, information that can be used by the receiving devices as inputs to their locally-stored access resource selection algorithm. Assuming the roadway is parsed into geographic location areas such as is shown by example at FIGS. 2-3A, the vehicular devices take this location information from the basic ITS node and run their algorithm to know which radio access resource they should use at any given time they want to access the shared radio access channel. In the FIG. 4 example the shared radio access channel is a V2V shared channel.

FIG. 5 is a chart of likelihood of transmission collisions versus the number of available orthogonal access resources; it compares results for a generic conventional (random) selection of an access resource and for two different implementations of these teachings for selecting an access resource in dependence on UE position. The packet arrival rate is 10 per second, the minimum V2V distance is 10 meters, and the range of V2V communication is 100 meters. The road length is 10 km and there are 40 vehicles per kilometer. The number of unique radio access resources varied from 12 to 20 as shown in the different bar clusters. LOC1 uses the roadway partition shown at FIG. 2, and LOC2 is from the algorithm for AR-ID shown above. FIG. 5 shows that as compared to the purely randomized access resource selection method, the approach described herein of using a distributed access resource selection algorithm reduces the probability of radio access collision, even to the point of zero collisions when the total number N of available ARs is greater than or equal to the number of lanes times the range/distance. This reduction is due to using the mobile radio device's location/position information which is unique to each device, and at least for embodiments in which the devices do not require network assistance to learn their position with sufficient precision this approach does not add to signalling overhead to/from the network as compared to conventional random selection of an access resource.

In general terms embodiments of these teachings use location/position information to 'orthogonalize' the neighboring mobile radio devices during an access to a shared radio channel. While the above examples implied there is one and only one radio access resource associated with each distinct geographic region, in other embodiments the access resources for use with these teachings may be split into subsets of resources and the access resource selection algorithm has one and only one of the subsets associated with each distinct location areas within the access region. The reuse considerations mentioned above would then apply for the subsets as opposed to the individual access resources. In practice for this resource subset embodiment, the access resource selection algorithm which could output the subset associated with the geographic region that corresponds to the mobile radio device's position that was input, and the device would select one access resource of that subset either randomly or by using some further algorithm. This approach could be useful for example in the scenario if the number of available ARs is not sufficient to cover the entire access region and would also reduce the collision probability.

Consider an example in which the access region is a 3 GPP cell, the location areas are geographic-based partitions of the access area as shown in FIGS. 3B, 3C, the shared radio channel is a RACH, the access resources consist of 20 preambles, and the mobile radio device is a UE. To initiate a call the UE needs to connect with the network via a contention-based RACH procedure by sending a preamble on the RACH, and the procedure continues once the network responds to that preamble. According to an example implementation of these teachings, the UE would input to the algorithm stored in its local memory its own location/position information. The algorithm finds the location area that corresponds to that position, and identifies which of the 20 preambles are associated with that location area. Whether the algorithm outputs an index or the preamble itself, the UE learns from the output of the algorithm which of the 20 preambles it should transmit on the RACH. A second UE in an adjacent location area will learn from its identical algorithm a different preamble associated with that adjacent location area corresponding to the location/position information of that second UE, and so even if both UEs transmit on the RACH at the exact same moment there will be no collision because they will use different preambles. Using of preambles as ARs in this example is just one option, the other possible set of ARs can consist of a number of time and/or frequency slots, etc.

FIG. 6 is a process flow diagram for selecting a radio access resource based on the mobile radio device's position according to certain embodiments of these teachings. In one embodiment FIG. 6 is from the perspective of the mobile radio device such as the UE 10 shown at FIG. 7, and at block 602 the mobile radio device uses its location/position information to select, itself, a radio access resource from a plurality of radio access resources shared among a plurality of mobile radio devices. Then at block 604 the mobile radio device sends a transmission on a wireless shared radio access channel using the selected radio access resource. According to the non-limiting examples above the radio access resource of block 602 is selected from the group: time slots; frequency blocks; preambles, and combinations of any two or more of these three. In some embodiments there is an algorithm that outputs the selected access resource or an index or other identifier thereof in response to an input of the location/position information; for the case of an index or identifier the UE can then map the output index or identifier to the access resource which it uses at block 604 when sending the transmission.

In certain examples above, the location/position information of block 602 represents the global and/or absolute physical position of the mobile radio device, while in other embodiments it was a position relative to a local reference location within the access region which by example could be a cell, a building, a roadway, or similar region.

In certain embodiments of these teachings, using the location/position information of the mobile radio device to select the radio access resource as in block 602 comprises: storing in a local memory of the mobile radio device a map or algorithm associating different radio access resources to different discrete location areas within an access region (the access region is a region with which the plurality of radio access resources are associated); using the stored map or algorithm to identify one of the discrete location areas that corresponds to the location/position information of the mobile radio device; and selecting the radio access resource that is associated in the local memory with the identified discrete location area. In some embodiments some or all of the location areas may be associated with one or with more than one access resource. For convenience this can be termed as each discrete location area being associated with a subset of one or more radio access resources, and in this case using the location/position information as in block 602 comprises selecting the subset of radio access resources associated with the discrete location area that corresponds to the location/position information of the mobile radio device; and a) if there is only one radio access resource in the selected subset, select the one radio access resource; else b) if there are more than one radio access resource in the selected subset, select one of the radio access resources of the subset (for example, randomly select from among the selected subset or use a further algorithm to select one access resource from among the selected subset).

In some embodiments the location/position information includes geographic position, direction of travel of the mobile radio device, and speed of travel of the mobile radio device. In this case it may be that there are two different viable procedures for selecting an access resource in the cell, in which case the procedure set forth at FIG. 6 may be conditional on the speed of travel of the mobile radio device exceeding a threshold.

In some embodiments, the location/position information of the mobile wireless/radio device may be determined in terms of measured performance characteristics of the radio signal, received by the device itself, instead of (or in a combination with) the geographic position. For example, the location information can be determined in the RSS/RSRP/RSRQ/SINR domain. Thus, for example, in terms of RSS, RSS=0-10 dBm could correspond to AR=#1, RSS=10-30 dBm to AR=#2, etc.

Further in some of the non-limiting examples above, the wireless shared radio access channel at block 604 is a random access channel and the transmission sent at block 604 requests establishment of a radio bearer (e.g., with a radio network/network infrastructure such as an eNB); and/or the transmission is a device-to-device beacon; and/or the transmission sent at block 604 is a request from the mobile radio device to initiate direct device-to-device (D2D) communications, and/or the transmission sent at block 604 is D2D user data (such as voice or data, or more generally data traffic).

It may be that in some deployments of these teachings the access region mentioned above with which the plurality of access resources are associated is defined by a first portion comprising discrete location areas, and at least a second portion that is geographically different from any of the discrete location areas; in this regard the above non-limiting examples had the busier roadway(s) within the access region/cell as such a first portion and the remaining areas of the access region/cell as the second portion where conventional LTE random access procedures were to be used by the UEs. In such a hybrid deployment the mobile radio device's implementation of the flow diagram of FIG. 6 may be conditional on the mobile radio device checking that its location/position information is within any of the discrete location areas within the access region/cell.

The flow diagram of FIG. 6 represent steps of a method, and/or certain code segments of software stored on a computer readable memory that embody the map/algorithm shown by non-limiting examples in FIGS. 1-4 for finding the radio access resource that corresponds to the mobile radio device's geographic position/location.

Figure 7:
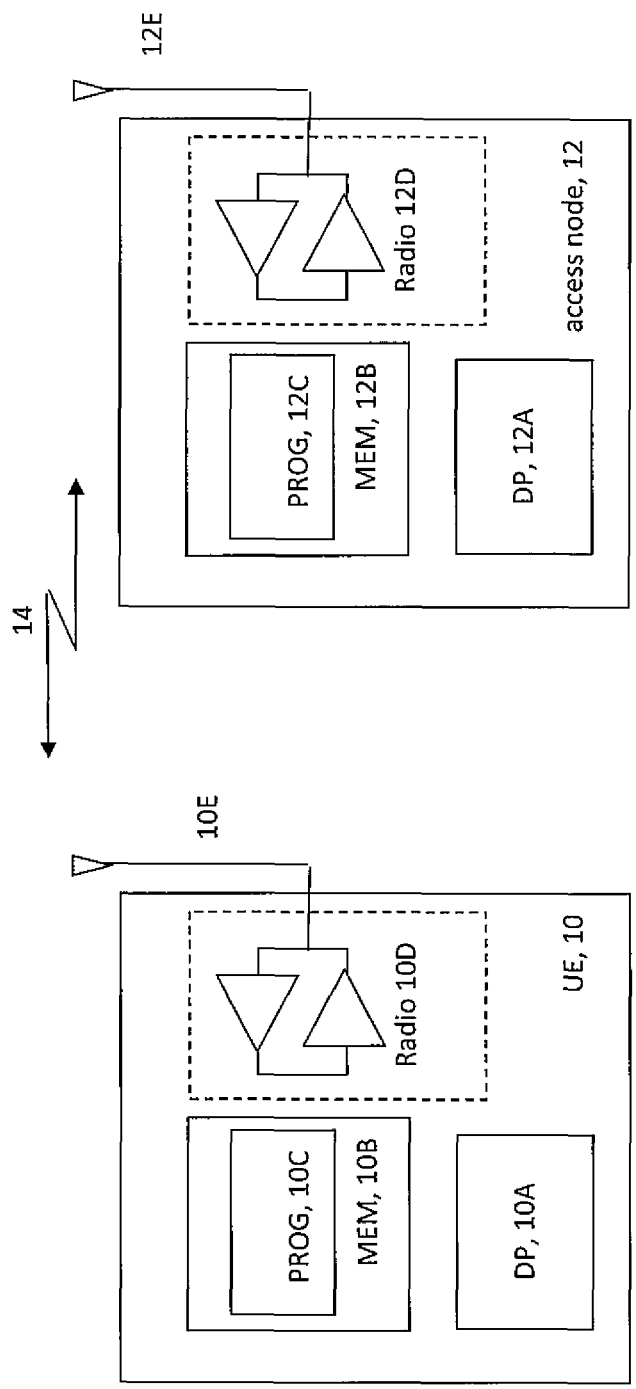
FIG. 7 is a diagram illustrating some components of the UE and the radio access node, each of which are suitable for practicing certain non-limiting aspects of the invention from their different perspectives.

FIG. 7 is a high level diagram illustrating some components of communication entities that may be used to practice embodiments of these teachings, wherein the access node 12 may correspond to any of the basic ITSs of FIG. 4 and the UE 10 may correspond to any of the vehicles there embodying the mobile radio devices. In the wireless system shown at FIG. 7 a wireless network is adapted for communication over a wireless link 14 with an apparatus such as a mobile radio communication device which in some embodiments may be referred to as a UE 10, via a network access node 12 or a radio access network (RAN) which may be implemented as a Node B, e-NB or other type of network base station including a WLAN access point. The network may include a network control element (NCE, not shown) that may include mobility management entity/serving gateway functionality, and which provides connectivity with another network such as a telephone network and/or a data communications network (e.g., the internet).

The UE 10 includes a controller, such as a computer or a data processor (DP) 10A, a computer-readable memory medium embodied as a memory (MEM) 10B that stores a program of computer instructions (PROG) 10C, and a suitable wireless interface such as radio 10D (shown as a transmitter and receiver) for bidirectional wireless communications with the access node 12 via one or more antennas 10E.

Similarly the access node 12 also includes a controller, such as a computer or a data processor (DP) 12A, a computer-readable memory medium embodied as a memory (MEM) 12B that stores a program of computer instructions (PROG) 12C, and a suitable wireless interface such as a radio 12D (shown as a transmitter and receiver) for bidirectional wireless communications with the UE 10 via one or more antennas 12E. The access node 12 may be coupled via a data/control path to the NCE (not shown) as well as to other access nodes via similar peer data/control paths.

At least one of the PROGs 10C, 12C is assumed to include program instructions that, when executed by the associated DP, enable the device to operate in accordance with exemplary embodiments of this invention, as detailed above by example. That is, various exemplary embodiments of this invention may be implemented at least in part by computer software executable by the DP 10A of the UE 10; by the DP 12A of the access node 12, and/or by the DP of the NCE (not shown), or by hardware, or by a combination of software and hardware (and firmware). Specifically, the access node 12 can provide to the UE 10 the map/algorithm that associates the access resources to the various designated geographic regions of the cell, and/or it may provide assistance information as detailed above. The NCE is assumed to have a DP, MEM and PROG as discussed above, and to communicate to the access node 12 via a modem and the data/control path or interface.

For the purposes of describing various exemplary embodiments in accordance with this invention the UE 10 and the access node 12 may also include dedicated processors, for example in the radio 10D/12D or elsewhere. Such dedicated modules may be constructed so as to operate in accordance with various exemplary embodiments detailed herein.

The DPs 10A and 12A may be of any type of circuitry comprising interconnected logical gates that is/are suitable to the local technical environment, and may include one or more of general purpose computers, special purpose computers, microprocessors, digital signal processors (DSPs) and processors based on a multicore processor architecture, as non-limiting examples. The wireless interfaces (e.g., radios 10D and 12D) may be of any type suitable to the local technical environment and may be implemented using any suitable communication technology such as individual transmitters, receivers, transceivers or a combination of such components.

In general, the various embodiments of the UE 10 can include, but are not limited to, smart phones whether handheld, wearable on the body or implantable in whole or in part within the user's body; other types of cellular telephones including those fixedly or removably disposed in vehicles such as automobiles and watercraft; personal digital assistants (PDAs) having wireless communication capabilities; portable computers having wireless communication capabilities including laptops, palmtops, tablets and e-readers; image capture devices such as digital cameras having wireless communication capabilities; gaming devices having wireless communication capabilities; music storage and playback appliances having wireless communication capabilities; Internet appliances permitting wireless Internet access and browsing; as well as portable units or terminals that incorporate combinations of such functions.

The computer readable MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. Any combination of one or more computer readable medium(s) may be utilized as a memory 10B/12B. The computer readable medium may be a computer readable signal medium or a non-transitory computer readable storage medium. A non-transitory computer readable storage medium does not include propagating signals and may be, for example, but not limited to: an electronic, magnetic, optical, electromagnetic, infrared, or semiconductor system, apparatus, or device; or any suitable combination of the foregoing. A more specific but non-exhaustive list of examples for the computer readable storage medium include: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In certain deployments of these teachings such as for D2X communications there may be two UEs as opposed to the UE 10 and access node 12 shown in FIG. 7. In other deployments what is shown in FIG. 7 as either or both of the UE 10 and access node 12 may be implemented as an MTC-type mobile device, for example a 2-way communication radio disposed within one of the vehicles shown at FIG. 4 in which these teachings are deployed for use with V2I and/or V2V communications.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

Acronyms used herein:
3GPP 3$^{rd}$ Generation Partnership Project
AR Access Resource
BT Bluetooth
CAM Cooperative Awareness Message
D2D Device-to-Device (a specific type of D2X)
D2I Device-to-Infrastructure (a specific type of V2X)
D2X Device communications (human-type communications)
D SRC Dedicated Short Range Communications
eNB Node B/base station of a LTE communication system
ETSI European Telecommunications Standards Institute
GNSS Global Navigation Satellite System
GPS Global Positioning System
ITS Intelligent Transportation Systems
LTE Long Term Evolution (of 3GPP)
M2M Machine-to-machine
METIS Mediterranean Introduction of GNSS Services
MTC Machine Type Communication
RACH Random Access Channel
RSRP Reference Signal Received Power
RSRQ Reference Signal Received Quality
RSS Reference Signal Strength
SA Selection Algorithm
SAE Society of Automotive Engineers
SINR Signal to Interference and Noise Ratio
TTI transmission time interval
UE User Equipment
UTM Universal Transverse Mercator
V2I Vehicle-to-Infrastructure (a specific type of V2X MTC)
V2V Vehicle-to-Vehicle (a specific type of V2X MTC)
V2X Vehicle communications (vehicle-specific MTC)
WLAN Wireless Local Area Network

What is claimed is:

1. A method for operating a mobile radio device, comprising:
using location/position information of the mobile radio device to perform a modulo operation to select, by the mobile radio device, a radio access resource from a plurality of radio access resources shared among a plurality of mobile radio devices, wherein the location/position information of the mobile radio device represents a position relative to a local reference location within an access region with which the plurality of radio access resources are associated; and
sending a transmission from the mobile radio device on a wireless shared radio access channel using the selected radio access resource.

2. The method according to claim 1, wherein the radio access resource is selected from a set of orthogonal resources, the set comprised of: time slots; frequency blocks; preambles; or any combinations thereof.

3. The method according to claim 1, wherein using the location/position information of the mobile radio device to perform the modulo operation to select the radio access resource comprises:
storing in a local memory of the mobile radio device a map or algorithm associating different radio access resources to different discrete location areas within an access region with which the plurality of radio access resources are associated;
using the modulo operation to identify one of the discrete location areas that corresponds to the location/position information of the mobile radio device; and
selecting the radio access resource that is associated in the local memory with the identified discrete location area.

4. The method according to claim 3, wherein each discrete location area is associated with a subset of one or more radio access resources, and selecting the radio access resource comprises:
selecting the subset of radio access resources associated with the identified discrete location area; and
if there is only one radio access resource in the selected subset, select the one radio access resource;
else if there is more than one radio access resource in the selected subset, select one of the radio access resources of the subset.

5. The method according to claim 3, wherein the discrete location areas define only a first portion of the access region and the access region comprises at least a second portion different from any of the discrete location areas;
and wherein the method is conditional on the location/position information of the mobile radio device lying within any of the discrete location areas within the access region.

6. The method according to claim 1, wherein the location/position information includes geographic position, direction of travel of the mobile radio device, and speed of travel of the mobile radio device.

7. The method according to claim 1, wherein the location/position information is estimated in terms of measured performance characteristics of the received radio signal.

8. The method according to claim 1, wherein the transmission from the mobile radio device on the wireless shared radio access channel is performed during a random access procedure.

9. The method according to claim 1, wherein at least one of:
the wireless shared radio access channel is a random access channel and the sent transmission requests establishment of a radio bearer with a radio network;
the transmission is a device-to-device beacon;
the transmission is a request from the mobile radio device to initiate direct device-to-device (D2D) communications; and
the transmission is device-to-device data traffic.

10. An apparatus comprising:
at least one processor; and
at least one non-transitory memory including computer program code;

wherein the at least one memory and the computer program code are configured with the at least one processor to cause the apparatus to:

use location/position information of a mobile radio device to perform a modulo operation to select, by the mobile radio device, a radio access resource from a plurality of radio access resources shared among a plurality of mobile radio devices, wherein the location/position information of the mobile radio device represents a position relative to a local reference location within an access region with which the plurality of radio access resources are associated; and send a transmission from the mobile radio device on a wireless shared radio access channel using the selected radio access resource.

11. The apparatus according to claim 10, wherein:

a map or algorithm associating different radio access resources to different discrete location areas within an access region with which the plurality of radio access resources are associated is stored in the at least one non-transitory memory;

the modulo operation is used to identify one of the discrete location areas that corresponds to the location/position information of the mobile radio device; and the radio access resource that is associated in the local memory with the identified discrete location area is the selected radio access resource.

12. The apparatus according to claim 11, wherein each discrete location area is associated with a subset of one or more radio access resources, and the radio access resource is selected by:

selecting the subset of radio access resources associated with the identified discrete location area; and
if there is only one radio access resource in the selected subset, select the one radio access resource;
else if there are more than one radio access resource in the selected subset, select one of the radio access resources of the subset.

13. The apparatus according to claim 11, wherein the discrete location areas define only a first portion of the access region and the access region comprises at least a second portion different from any of the discrete location areas;

and wherein using the location/position information to select the radio access resource conditional on the location/position information of the mobile radio device lying within any of the discrete location areas within the access region.

14. The apparatus according to claim 10, wherein the location/position information includes at least one of geographic position, direction of travel of the mobile radio device, and speed of travel of the mobile radio device.

15. The apparatus according to claim 10, wherein the location/position information is estimated in terms of measured performance characteristics of the received radio signal.

16. The apparatus according to claim 10, wherein the transmission from the mobile radio device on the wireless shared radio access channel is performed during a random access procedure.

17. The apparatus according to claim 10, wherein at least one of:

the wireless shared radio access channel is a random access channel and the sent transmission requests establishment of a radio bearer with a radio network;
the transmission is a device-to-device beacon; and
the transmission is a request from the mobile radio device to initiate direct device-to-device (D2D) communications; and
the transmission is device-to-device data traffic.

18. A computer readable memory having stored therewith computer program code, which when executed controls a mobile radio device to at least:

use location/position information of the mobile radio device to perform a modulo operation to select a radio access resource from a plurality of radio access resources shared among a plurality of mobile radio devices, wherein the location/position information of the mobile radio device represents a position relative to a local reference location within an access region with which the plurality of radio access resources are associated; and to send a transmission from the mobile radio device on a wireless shared radio access channel using the selected radio access resource.

19. The computer readable memory according to claim 18, wherein the location/position information of the mobile radio device is used to perform the modulo operation to select a radio access resource by:

storing in a local memory of the mobile radio device a map or algorithm associating different radio access resources to different discrete location areas within an access region with which the plurality of radio access resources are associated;
using the modulo operation to identify one of the discrete location areas that corresponds to the location/position information of the mobile radio device; and
selecting the radio access resource that is associated in the local memory with the identified discrete location area.

* * * * *